United States Patent
Schwartz

(10) Patent No.: US 7,631,349 B2
(45) Date of Patent: Dec. 8, 2009

(54) METHOD AND APPARATUS FOR FIREWALL TRAVERSAL

(75) Inventor: Elliot Schwartz, Sunnyvale, CA (US)

(73) Assignee: Digi International Inc., Minnetonka, MN (US)

(*) Notice: Subject to any disclaimer, the term of this patent is extended or adjusted under 35 U.S.C. 154(b) by 811 days.

(21) Appl. No.: 09/759,728

(22) Filed: Jan. 11, 2001

(65) Prior Publication Data

US 2002/0199114 A1 Dec. 26, 2002

(51) Int. Cl.
*G06F 15/16* (2006.01)
*G06F 12/14* (2006.01)
*G06F 15/173* (2006.01)
*H04L 9/00* (2006.01)

(52) U.S. Cl. .................. 726/11; 726/23; 713/153; 713/168; 709/218; 709/225; 709/229

(58) Field of Classification Search ............ 713/200, 713/210, 153, 154, 201
See application file for complete search history.

(56) References Cited

U.S. PATENT DOCUMENTS

| | | | |
|---|---|---|---|
| 5,790,977 A | | 8/1998 | Ezekiel |
| 5,852,717 A * | 12/1998 | Bhide et al. ............ 709/203 |
| 5,950,195 A * | 9/1999 | Stockwell et al. ......... 707/4 |
| 5,983,350 A * | 11/1999 | Minear et al. ........... 713/201 |
| 5,987,611 A * | 11/1999 | Freund .................. 726/4 |
| 5,991,795 A | 11/1999 | Howard et al. |
| 5,999,979 A * | 12/1999 | Vellanki et al. ......... 709/232 |
| 6,044,401 A | 3/2000 | Harvey |
| 6,061,797 A * | 5/2000 | Jade et al. ............ 713/201 |
| 6,219,786 B1 * | 4/2001 | Cunningham et al. ...... 713/152 |
| 6,233,688 B1 * | 5/2001 | Montenegro ............ 713/201 |
| 6,484,206 B2 * | 11/2002 | Crump et al. ........... 709/227 |
| 6,549,773 B1 * | 4/2003 | Linden et al. ......... 455/426.1 |
| 6,550,012 B1 * | 4/2003 | Villa et al. ........... 713/201 |
| 6,609,154 B1 * | 8/2003 | Fuh et al. ............. 709/225 |
| 6,651,174 B1 * | 11/2003 | Nagaoka et al. ........ 713/201 |
| 6,854,063 B1 * | 2/2005 | Qu et al. ............. 713/201 |
| 6,950,947 B1 * | 9/2005 | Purtell et al. ......... 370/229 |
| 7,051,369 B1 * | 5/2006 | Baba .................. 726/23 |
| 2002/0078198 A1 * | 6/2002 | Buchbinder et al. ...... 709/224 |
| 2004/0187028 A1 * | 9/2004 | Perkins et al. ......... 713/201 |
| 2006/0168321 A1 * | 7/2006 | Eisenberg et al. ....... 709/238 |
| 2007/0022289 A1 * | 1/2007 | Alt et al. ............. 713/168 |

FOREIGN PATENT DOCUMENTS

| | | |
|---|---|---|
| EP | 0 613 274 A2 | 8/1994 |
| WO | WO 98/34385 | 8/1988 |
| WO | WO 2005064842 A1 * | 7/2005 |

OTHER PUBLICATIONS

Chang, Rocky; Defending against Flooding-Based Distributed Denial-of-Service Attacks: A Tutorial, 2002, IEEE, pp. 42-51.*

(Continued)

*Primary Examiner*—Ayaz Sheikh
*Assistant Examiner*—Aravind K Moorthy
(74) *Attorney, Agent, or Firm*—Heimlich Law; Alan Heimlich, Esq.

(57) ABSTRACT

A method and apparatus for traversing a firewall are described.

21 Claims, 6 Drawing Sheets

OTHER PUBLICATIONS

Gou et al, Multi-agent System for Multimedia Communications Traversing NAT/Firewall in Next Generation Networks, 2004, IEEE, pp. 99-104.*

PCT Search Report, mailed Sep. 5, 2002, 4 pages.

Cooper, I, et al., *Web Proxy Auto-Discovery Protocol*, Internet Online, Nov. 15, 2000 URL: http://www.wrec.org/Drafts/draft-cooper-webi-wpad-00.txt XP-002209978.

* cited by examiner

METHOD AND APPARATUS FOR FIREWALL TRAVERSAL

FIELD OF THE INVENTION

The present invention pertains to the field of computers and communications. More particularly, the present invention relates to traversing a firewall.

BACKGROUND OF THE INVENTION

Computer networks are common. Connecting to other computer networks is also common. When connecting networks together, for example, a local area network (LAN) to a wide area network (WAN), there may be the need to isolate the networks to restrict access. There are several approaches to achieving this isolation. One approach is to use, what is referred to in the art as, a firewall. A firewall may be implemented in a variety of ways.

One approach a firewall may implement is packet filtering. In packet filtering, the firewall analyzes network traffic at and below the transport protocol layer. With respect to the Internet, a firewall may examine the Internet Protocol (IP) packet. Based upon a set of predefined rules the packet filtering firewall may allow communication based upon such factors as, direction of the communication, where the packet arrives physically, the supposed source and/or destination of the communication, the type of transport layer, etc. Common transport layers that may be checked in the Internet environment are Transmission Control Protocol (TCP), User Datagram Protocol (UDP), Internet Control Message Protocol (ICMP), etc. For example, a firewall may examine a TCP and/or UDP transport layer protocol to check source and destination port numbers. Additionally, firewalls utilizing packet filtering may also perform network address translation (NAT). NAT readdresses packets such that the topology of an internal network is hidden from view of an outsider. That is, the readdressing tends to hide the internal IP addresses from external view. Traffic originating from the internal network and sent out though the firewall is readdressed so that the outgoing traffic may appear to be originating from a different host than the internal host.

Another approach to security is a circuit level firewall. This approach attempts to monitor and validate the setting up and tearing down of connections. Once a connection is set up then communications are validated as to this connection circuit and allowed to pass. For example, a firewall may monitor the setting up of a TCP connection and after verifying that the TCP connection has been properly set up will allow communications to pass until such time as the connection is torn down. The firewall may also monitor the source and destination IP addresses for additional security to try and prevent another entity from sending and/or receiving unknown packets. Additionally, a circuit level firewall may employ NAT as discussed above.

Another approach is a called an application layer firewall. As the name implies, the application layer firewall evaluates packets for validity with respect to an application. Application layer firewalls generally include proxy services. Proxy services are programs that manage network traffic through a firewall for a specific type of service. For example, several common proxy services include support for hypertext transfer protocol (HTTP), file transfer protocol (FTP), Gopher, Telnet, etc. Because the proxy services are examining incoming requests from local users, validating them and then forwarding them on to an outside network and then receiving a response from the outside network and forwarding them back to the original requestor, the proxy services are sometimes referred to simply as a proxy and/or a proxy server. That is, with respect to the local user, the proxy performs the function of a server by delivering to the local user the information, without the local user actually being connected directly to the outside source of information. With respect to an outside or external resource, the proxy looks like a standard client placing a request and receiving information. Because of this proxy process, internal IP addresses are generally shielded from external access. Additionally, because a proxy can examine packets with respect to specific applications, the proxy is capable of caching information retrieved, filtering specific information, performing user authentication, etc.

A device located behind a firewall is presented with challenges in attempting to contact an external or outside resource. Likewise, an external device attempting to reach an internal resource behind a firewall is presented with the need to get through the firewall. When the devices behind the firewall are computers with keyboards, monitors, and loadable software, it is often possible to pull up configuration screens to properly configure the device for communication through the firewall. It is not so easy for an appliance type device that may be lacking user input capability to be configured. This presents a problem.

SUMMARY OF THE INVENTION

A method and apparatus for firewall traversal are disclosed. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for traversing a firewall are described. For purposes of discussing the invention, it is to be understood that various terms are used by those knowledgeable in the art to describe communications, protocols, applications, protection mechanisms, etc. One such term is firewall. A firewall is an industry standard term that may encompass, in an embodiment, hardware, firmware, software, or any combination of these. The function of a firewall is to control in some manner the access and/or communication between two networks. For example, in one case, a firewall may prevent an Internet user from accessing a private Internet. The above brief description is to serve as an example only, and is not intended to override the industry standard definitions understood by those skilled in the art.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices;

electrical, optical, acoustical or other form of propagated signals (e.g., carrier waves, infrared signals, digital signals, etc.); etc.

Figure 1:
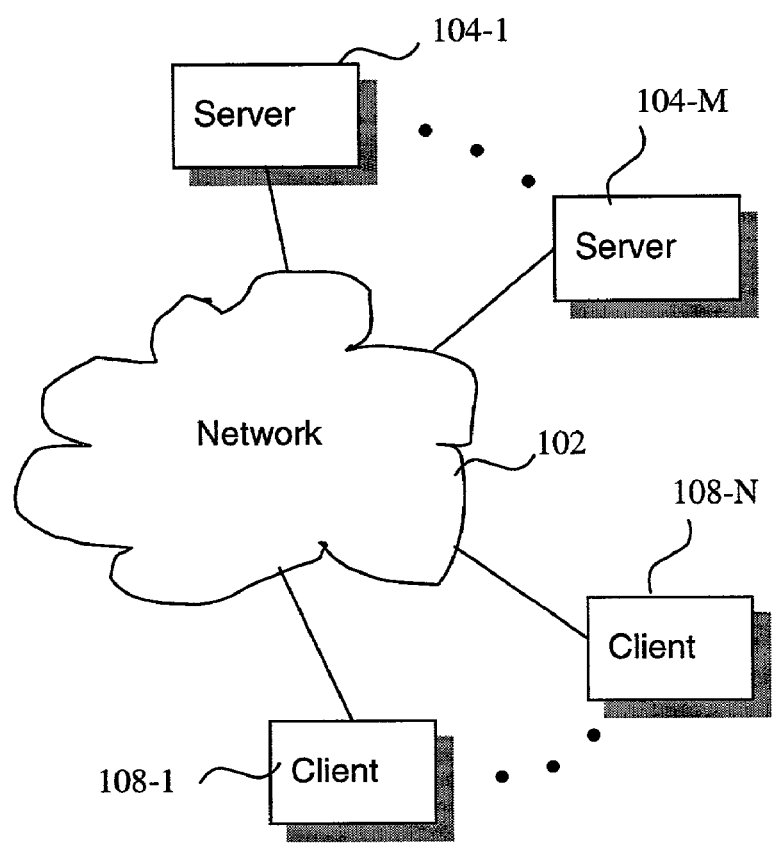
FIG. 1 illustrates a networked computer environment.

FIG. 1 illustrates a network environment in which the techniques described may be applied. As shown, several computer systems in the form of M servers 104-1 through 104-M and N clients 108-1 through 108-N are connected to each other via a network 102, which may be, for example, the Internet. Note that alternatively the network 102 might be or include one or more of: a Local Area Network (LAN), Wide Area Network (WAN), home network, satellite link, fiber network, cable network, or a combination of these and/or others. The method and apparatus described herein may be applied to essentially any type of communicating means or device whether local or remote, such as a LAN, a WAN, a computer, an appliance, a home security system, a disk drive, a home computing environment, an entertainment system, media storage, etc.

Figure 2:
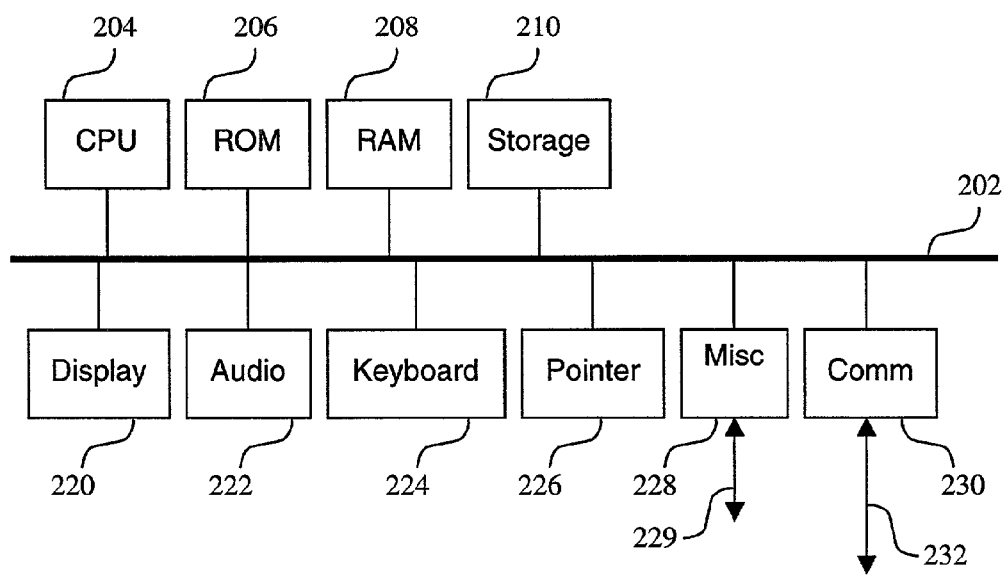
FIG. 2 is a block diagram of a computer system.

FIG. 2 illustrates a computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks, optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a set-top box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an IEEE 802.3 (Ethernet) adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard.

Another example may be, for example, a home video recorder having limited user input capability. Yet another example may be a home appliance such as a clothes washer, dryer, refrigerator, air conditioner, etc. What is to be appreciated is all these devices with varying support and user input resources may be connected to a network, for example, a home network. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

In FIG. 1, the client 108-1 may have the capability to access the network 102. This capability may allow booting, updates, or transfer of information thereto from a server via the Internet, another network, a local network, a local machine, or a combination of these to/from the client. A description of the method of updating or installation of any revised code and/or data or settings is not necessary for an understanding of the present invention.

The transfer of information in the present invention may, but is not limited to, accesses through, for example, the Communications device 230 which might be, for example, an Ethernet adapter allowing access to a network wherein the information may be retrieved.

A client may be, but is not limited to, one or more of the elements of FIG. 2. For example, Storage 210 may be an autonomous client that handles how data is to be stored and retrieved. Audio 222 may be a subsystem that handles, for example: accessing resources; buffering received content from, for example, a web site; playing music; powering down speakers; etc. Communications device 230 may, for example, be part of a system that may start up or communicate with other devices upon receiving a message.

Figure 3:
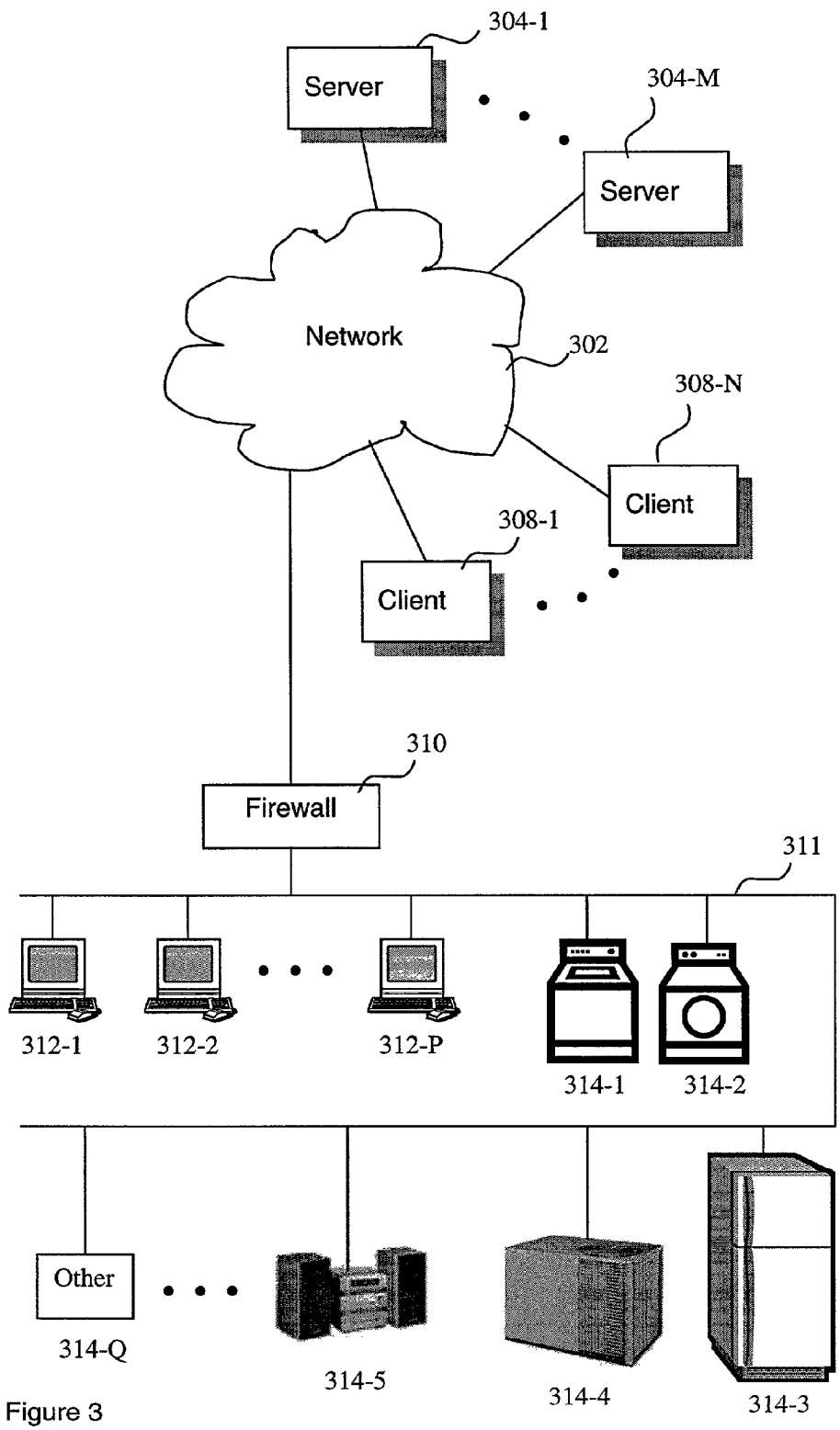
FIG. 3 illustrates a firewall between two networks.

FIG. 3 illustrates a network environment in greater detail in which the techniques described may be applied. As shown, several computer systems in the form of M servers 304-1 through 304-M and N clients 308-1 through 308-N are connected to each other via a network 302, which may be, for example, the Internet. Note that alternatively the network 302 might be or include one or more of: a Local Area Network (LAN), Wide Area Network (WAN), a home network, satellite link, fiber network, cable network, or a combination of these and/or others.

Firewall 310 is connected to network 302 and to a local area network (LAN) 311 that is located behind the firewall 310. The LAN 311 has computers 312-1 through 312-P connected to the firewall 310. Additionally, the LAN 311 connects several non-traditional devices (314-1 through 314-Q) to the firewall 310. These non-traditional devices are represented by a washer 314-1, a dryer 314-2, a refrigerator 314-3, a heating ventilating and air conditioning (HVAC) unit 314-4, a home entertainments system 314-5, and other 314-Q devices.

Traditionally connected devices, such as computers 312-1 through 312-P, generally have user interfaces such as keyboards and monitors that facilitate the setting of parameters for configuring the device to communicate through the firewall 310 to, for example, an outside network 302, which may be for example, the Internet. Non-traditional devices, as exemplified by 314-1 through 314-Q, generally do not have such interfaces for configuring their respective devices for communication through a firewall.

Connection of non-traditional devices to, for example, the Internet may provide advanced features. For example, connection of a washer 314-1, dryer 314-2, refrigerator 314-3, and HVAC 314-4, may allow these devices to relay operational information, such as malfunctions, temperature, gas pressure, and operating conditions to for example, a manufacturer or repair facility also connected to the Internet. In this scenario, early diagnosis and preventive maintenance may be possible. This information must be transferred from the non-traditional devices across the LAN 311 through the firewall 310 to a destination. Another example is a home entertainments system 314-5 when first purchased and plugged into, for example, a home network, may be able to connect to the manufacturer's site, be registered, and have full access to, for example, music sites. Other sites may only allowed limited access, for example, to listen to an introduction track of music, or they may receive a advertisement telling the consumer how and when to purchase a product. It is to be appreciated that various business models may evolve from such a capability. The ability to pass through the firewall is where the present invention for firewall traversal is applicable. One skilled in the art will recognize that bi-directional communications is readily possible once the firewall has been traversed.

The network to which this non-traditional device may be connected may have a Dynamic Host Configuration Protocol (DHCP) server, which may allow the device to obtain an IP address for communicating. If the device is not successful in obtaining an IP address for communication without user assistance, then other methods for inputting an IP address may be needed. One such approach may be the user entering information from an input/output interface. For example, the device may have a keypad for entering such information. Another approach, if the device is connected to a network with a computer attached, may be to use the computer to configure the device. For example, the user may be able to input address and configuration information that is transferred to the device, or the computer may be able to download, for example, a plugin that may then configure the device. Another alternative may be to use, for example, a serial connection, such as the Electronic Industries Association (EIA) RS232 standard, Universal Serial Bus (USB), a Infrared Data Association (IrDA) standard, etc., between a computer and the device, to configure the device. Yet, another approach may be to have the device try different addresses.

Figure 4:
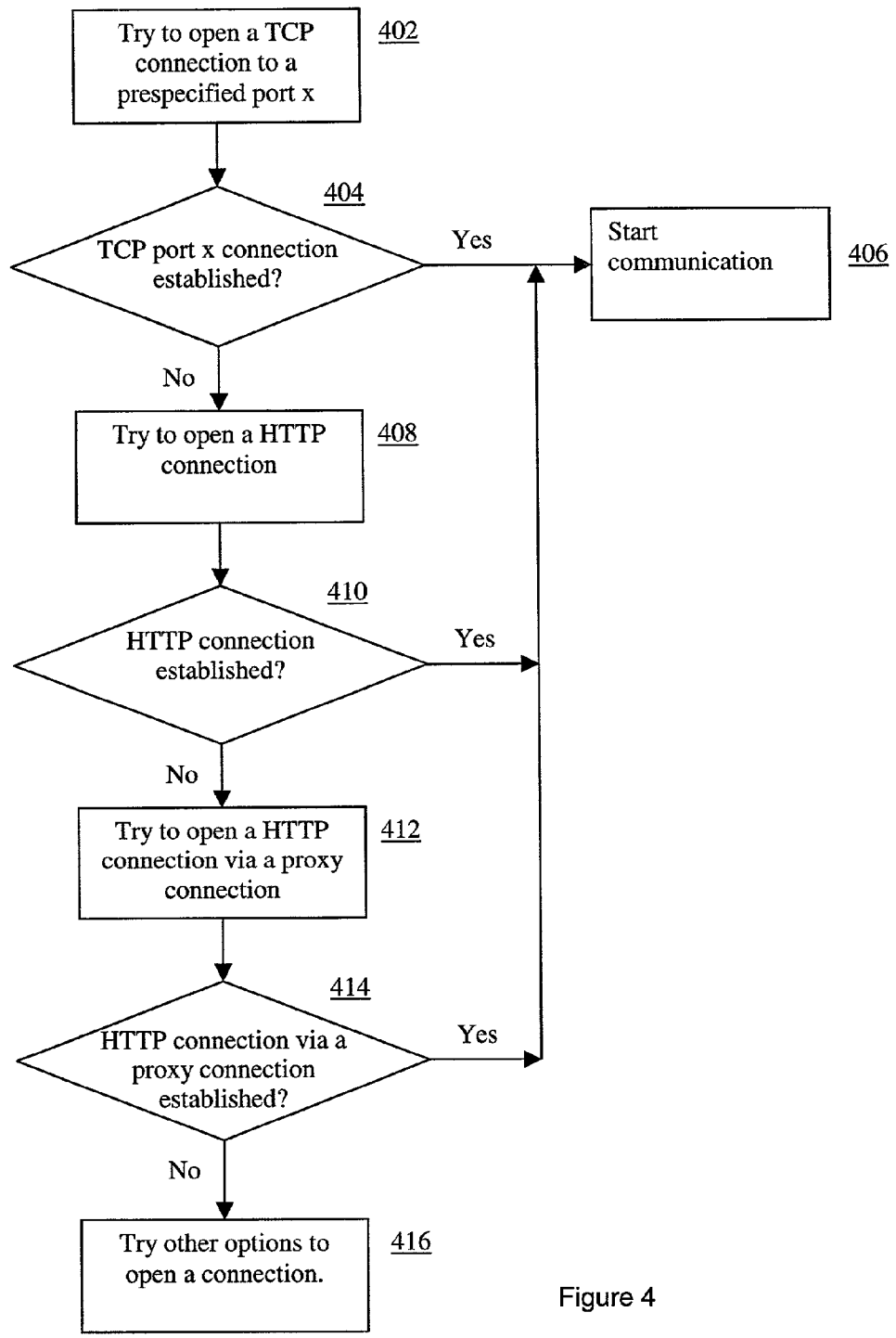
FIGS. 4, 5, and 6 illustrate possible embodiments of the present invention.

FIG. 4 illustrates a flow chart depicting the major operations for traversing a firewall in one embodiment. It is to be understood that opening a connection or establishing a communication link refer to effectively the same thing, that once achieved a transfer of information (i.e. communication) is possible with an entity on the other side of a firewall. One skilled in the art will recognize that a particular protocol may require, for example, handshakes, synchronization bits, proof of identity, etc. before a connection may be opened, such that communication between devices may proceed. For purposes of this discussion however, such details are not necessary to understand the invention. Therefore, unless specified otherwise, reference to opening a connection and/or establishing a communication link refers to a final result that devices are capable of transferring information and in so doing may communicate with each other. Transferring information is understood to be transmitting information, receiving information, or both transmitting and receiving information.

Referring to FIG. 4, a device according to one embodiment of the present invention tries to open a TCP connection to a prespecified port (denoted as x) 402 at a given address. Since the device is attempting to open a connection, we shall refer to it as a client and the destination it is attempting to establish a connection with we shall call a server. These are industry standard terms and well understood in the art. The prespecified port may be chosen based upon, for example, characterization of firewalls from various manufacturers and represents an initial best guess of a port that will allow connection. Since TCP utilizes the IP on the Internet, an IP address, for example, of the manufacturer of the device or a central location may be used. Connecting to a manufacturer's site, for example, on the Internet, may allow the manufacturer to perform diagnostics on the device, perform updates on code or firmware, etc. Such services may be free and/or fee based. Similarly, a central location or site may be contacted that may perform such services. Additionally, a central site may refer the device to another location or locations. These other locations may provide additional services and/or be third party support. For example, a site may update the device on the latest and/or best approaches to firewall traversal strategies. Such updates may be stored in the device itself (e.g. flash memory, etc.) and/or a storage device to which the device has access (e.g. disk storage, etc.).

Next a check is made to see if the TCP prespecified port x connection is established 404. If the TCP port x connection is established then the device may start communication 406. If the TCP port x connection is not established then the device tries to open a HTTP connection 408. A check is made to see if the HTTP connection is established 410. If a HTTP connection is established then the device may start communication 406. If the HTTP connection is not established then the device tries to open a HTTP connection via a proxy connection 412. A check is made to see if the HTTP connection via a proxy connection is established 414. If a HTTP connection via a proxy connection is established then the device may start communication 406. If the HTTP connection via a proxy connection is not established then the device may try other options to open a connection 416, such as trying a different address with the sequence described above.

It is to be understood that the blocks indicated in FIG. 4 and discussed above may be implemented in a variety of ways and/or forms. In one implementation, for example, the blocks of FIG. 4 may be implemented on a computer based system executing software code. For example, trying to open a connection (e.g. 402, 408, 412) may be implemented by software code that configures, for example, an Ethernet adapter card. Similarly, checking to see if a connection has been established (e.g. 404, 410, 414) may be implemented by software that checks to see if an outbound message is being replied to. Trying other options to open a connection 416, and start communication 406, likewise may be implemented by software executing on a computer based system connected to, for example, an Ethernet interface.

While FIG. 4, has illustrated an embodiment using TCP, one skilled in the art will recognize that the same approach may be used for other transport protocols, for example UDP.

Figure 5:
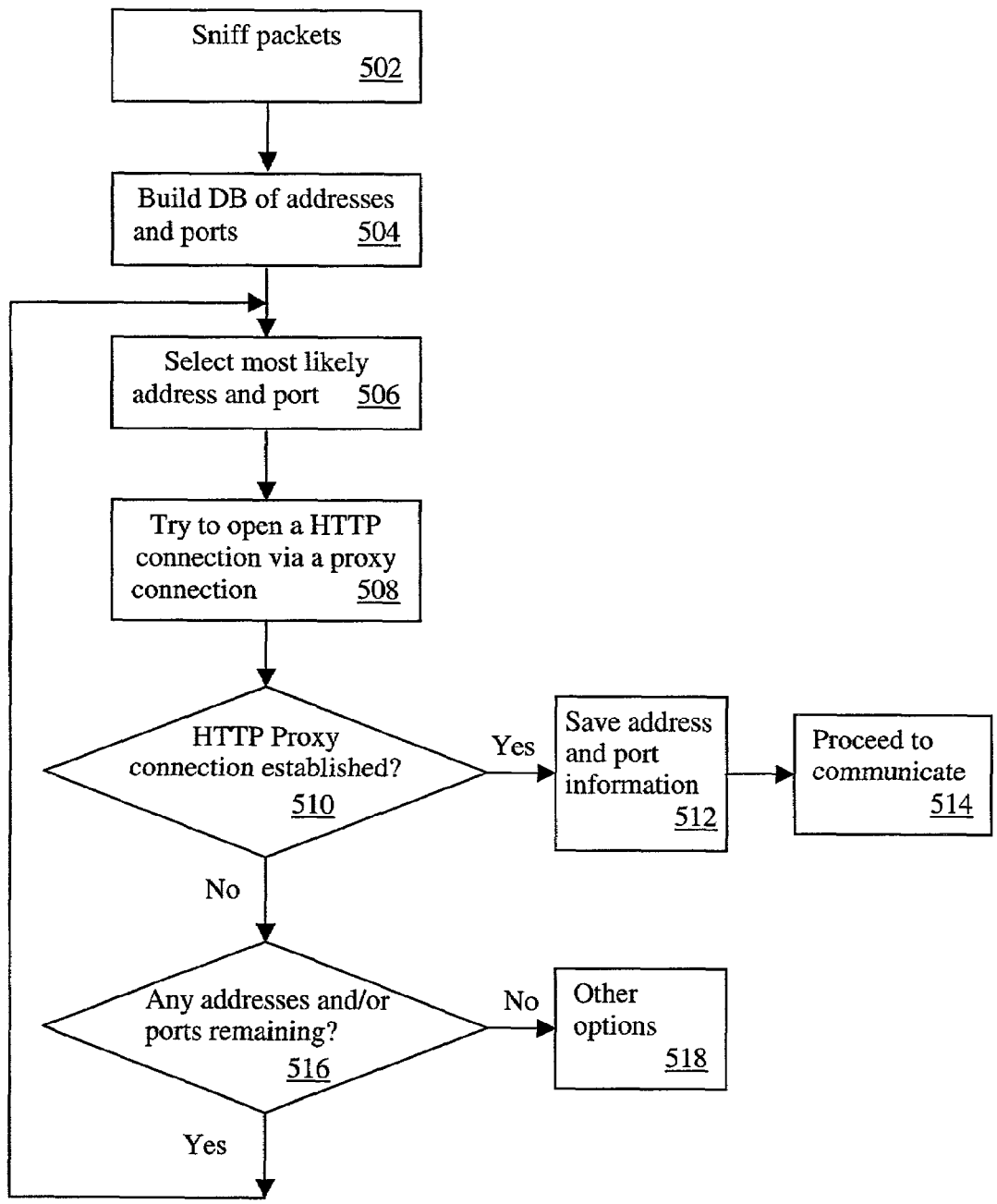

FIG. 5 is an embodiment of one approach for trying to establish a HTTP connection via a proxy connection. In this embodiment, the device trying to communication will try and discern the correct address and port for connection through, for example, a proxy. The device will sniff packets 502 that may be traversing the communication medium the device is connected to, for example, an Ethernet. That is, if the device in interfaced to an Ethernet, the device's Ethernet interface may be placed in promiscuous mode which may allow the device to monitor Ethernet network traffic. The device will then build a database (DB) of addresses and ports 504 extracted from the packets. Then the device will select the most likely address and port 506 from the database, and try to open a HTTP connection via a proxy connection 508. The device will then check to see if the HTTP connection via a proxy connection is established 510. If the connection is established, then the device will save the address and port information 512, and proceed to communicate 514. On the other hand, if the HTTP connection via a proxy connection is not established, the device will check to see if any addresses and/or ports are remaining 516. If no more addresses and/or ports are remaining to try then the device may try other options 518. If there are any addresses and/or ports remaining 516, then the device again will select the most likely address and port 506 and try the process again. It is to be understood that select most likely address and port 506 is based upon a database of addresses and ports and that this database changes. That is, if an address and/or port does not yield a successful connection, then the next time the device will select the most likely address and port 506, it may not include the unsuccessful port. For example, the result of the build DB of addresses and ports 504, may for example, include the ports 23, 7, 110, 49, 69, 1433, and 25 for a given address. Assume for this example that the order of most likely port to less likely port is 110, 7, 25, 49, 1433, 69, and 23. Initially then the device will select the most likely port 506 for the given address, that being port 110. If a HTTP connection via a proxy connection cannot be established with this port 110, then the device will check to see if any ports are remaining 516, and finding that there are, will again select the most likely port 506. However, this time port 110 has failed and so the most likely port will be 7. It will be appreciated that this may continue until there are no addresses and/or ports remaining.

The device will build a database (DB) of addresses and ports 504 extracted from the packets sniffed. This database may be built over a period of time, either short or long. Additionally, the device may capture all traffic or may sample traffic. For example, if the device has limited resources, it may sample the traffic over a long period of time to build the database. The device if time aware, may decide to sniff packets on a sample basis from, say 8 A.M. till 9 A.M. with the assumption that a good portion of the network traffic may be checking resources located, for example, on the Internet and so beyond the firewall. Likewise, the device may not check traffic from 1 A.M. to 5 A.M. assuming that most of the network traffic may consist of intranet activity, such as automated backups, etc. A device having more resources may be capable of sniffing in realtime all network traffic.

Once the database of addresses and ports is built, the device will select the most likely address and port 506 from the database. The selection criteria for the most likely address and port to allow a HTTP connection via a proxy connection may be based on different factors. One such factor may simply be the address and port with the most activity. Of course, if most of the activity is on an intranet, then this address and port will not allow for external access beyond the firewall, for example, access to the Internet. Another criteria may be to look at the content of the network traffic. For example, traffic that appears to have HTTP content is likely to be from an external site, from for example, the Internet. A ranking based on the content of the traffic may thus be a more reliable indicator of an address and port that is likely to succeed in traversing the firewall. Another technique, aside from trying well known ports such as 80, 3129, 8080, etc., may be to do a local name lookup and see if a keyword such as "proxy," "cache," "firewall," etc. is in the name. If so, then this may indicate a likely candidate to try for a successful connection. Additionally, it may be possible to extract a likely candidate for successful communication be analyzing access patterns of the traffic. That is, if many connections are being made to a device on the net, but few are being made from it to other devices, this may be indicative of a proxy. Another indication of a proxy may be where most traffic is away from a device to many other devices.

After the device has selected the most likely address and port 506 to try, there may be other operations that need to be performed before the device can try to open a HTTP connection via a proxy connection 508. For example, if the local network is an Ethernet and a proxy firewall is connected to this Ethernet, then the port number must be associated with an Ethernet address to communicate with the proxy.

If a HTTP connection via a proxy connection is established, then the device will save the address and port information 512, and proceed to communicate 514. The device may save the address and port information 512 in a variety of ways. For example, in one embodiment, the device may store the address and port information in an on-board flash memory. In another embodiment, the device may place an indicator in the database of addresses and ports that a particular address and port was successful in establishing a connection. One skilled in the art will appreciate the myriad of ways this type of information may be stored.

If no more ports are remaining to try then the device may try other options 518. Other options may be, but are not limited to, retrying the entire process (from 502 onward), sniffing packets at a different time, waiting and retrying the ports in the database at a later time, etc.

Even if a successful connection is established, one skilled in the art will appreciate that networks get reconfigured, new devices (such as routers, switches, firewalls, etc.) get added and/or old ones removed. Under these circumstances, it is prudent, for the device to periodically attempt to establish new connections in the event that the earlier approaches may no longer work. Rather than waiting for an unsuccessful connection to start this process of locating successful connections, the device may periodically attempt connections and record such results in the database as previously discussed. In this manner, the device may have an up-to-date database indicating those approaches that were successful. Additionally, the search for a successful connection may be ordered in such a way that the most efficient methods of communicating through a firewall are attempted first. In this case then, the first such successful communication will also most likely be the most efficient.

Figure 6:
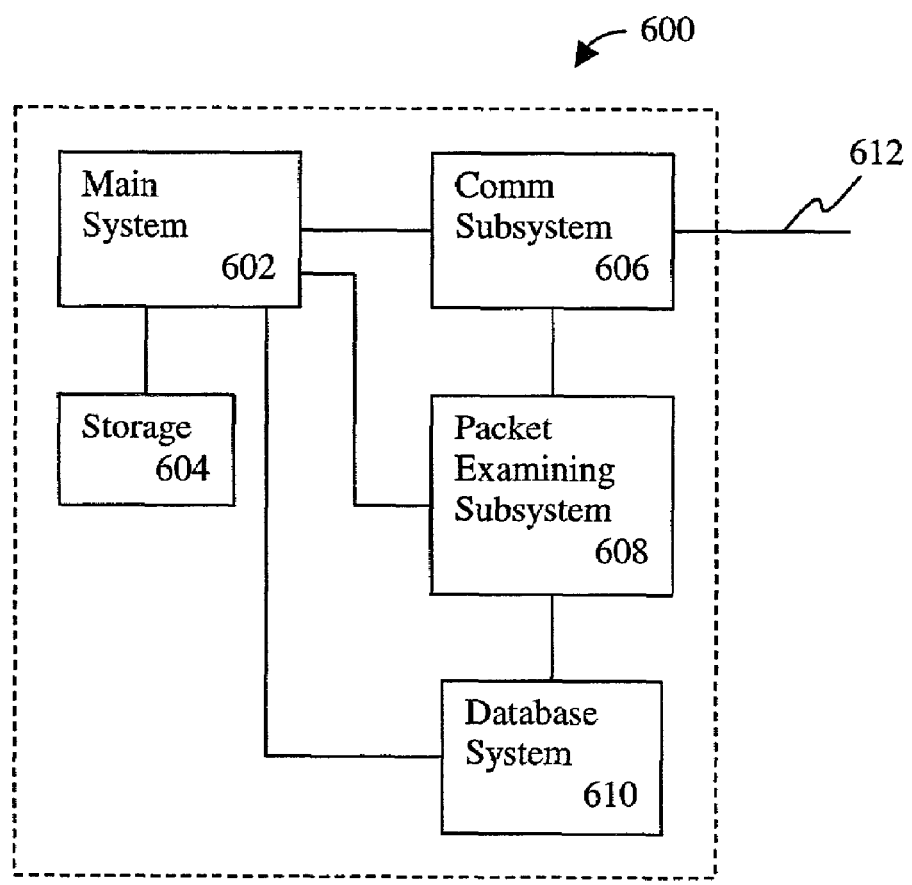

FIG. 6 illustrates another possible embodiment of the present invention as a device 600. Device 600 has a main system 602 that is coupled to storage 604, a communication subsystem 606, a packet examining subsystem 608, and a database system 610. The communication subsystem 606 is also coupled to a communications medium 612, and a packet examining subsystem 608. The packet examining subsystem is also coupled to the database system 610. One skilled in the art understands that the embodiment of device 600, the main system 602, the storage 604, the communication subsystem 606, the packet examining subsystem 608, and the database system 610, may be, but are not limited to, one or more and/or a combination of the elements of FIG. 2.

One example of operation for the embodiment of device 600 as shown in FIG. 6, is as follows. Main system 602 executes code that attempts to establish a communications link through communications medium 612 by configuring, and transmitting and receiving information to/from communications subsystem 606. For example, communications subsystem 606 may be an Ethernet interface. The main system 602, may for example, attempt to communicate through the communications medium 612 by sending a TCP packet with an IP datagram to a specified Ethernet address. If communication is established through the communication medium 612 to, for example, a remote site beyond a firewall, then the packet examining subsystem 608 and database system 610 may not need to be used. On the other hand, if the attempted communication is unsuccessful, then the device 600 may need to observe network traffic across the communications medium 612 in an attempt to determine parameters that may allow successful communication. These parameters may be, but are not limited to, source and/or destination port numbers, source and/or destination addresses for IP and/or Ethernet. Additionally, the packet examining subsystem 608 may examine packet data contents in an attempt to find more likely parameters for successful communication. For example, the packet examining subsystem 608 may examine packets for HTTP type data. HTTP type data may be an indication of data that is being communicated from outside the firewall and so the ports and/or addresses associated with this packet may provide a better opportunity to successfully traverse the firewall.

Database system 610 may be, for example, a list of likely port numbers for accessing beyond a firewall. The database system may also be a sophisticated system capable of performing statistical analysis on the results generated by the packet examining subsystem 608. The main system 602 may configure the packet examining subsystem 608 to look at particular items of interest, for example, IP port numbers. Main system 602 may interact with the database system 610 by retrieving parameters and attempting communications using those parameters, and if successful communications are established, the main system 602 may then store these parameters in the storage 604, or may communicate a success or failure to the database system 610 such that this information of success or failure is associated with that particular parameter's database entry.

While the above illustrations have shown various embodiments of the present invention, it is to be understood that the present invention is an implementation of an adaptive algorithm for firewall traversal. As such, one skilled in the art understands that there are many ways to implement such an adaptive algorithm. Furthermore, the traversal approaches are not limited to traditional firewalls, for example, gateways that require traversal may also make use the techniques disclosed. What is to be appreciated is the adaptive nature of the present invention to establish communication with another entity.

Additionally the above illustrations have shown the most common embodiments for protocols. One skilled in the art understands that there are many other networks and interfaces than just Ethernet (e.g. fiber, coax, wireless, etc.), and that IP and other protocols may be performed over other communication links (e.g. serial Point to Point Protocol (PPP) for IP), in practicing the present invention.

Additionally, where reference has been made to industry standard protocols, such as, TCP, IP, etc., it is to be understood that other protocols may be required in the implementation and thus are understood to also be referred to. For example, Request For Comment (RFC) 1011 defines Official Internet Protocols. Within RFC 1011, protocols may be required, recommended, elective, experimental, none, etc. Thus, for example, implementation of IP (Internet Protocol), as specified in RFC 791, is required. Also required in any IP implementation is Internet Control Message Protocol (ICMP), as defined in RFC 792. Thus, any discussion of IP implies the existence of at least these protocols. These standards may evolve over time and change, however, the techniques of the present invention are to be considered adaptable to such changes.

Reference to UDP is as defined in RFC 768, TCP as defined in RFC 793, HTTP as defined in RFC 2616, etc. and other standards as referred to in the respective RFC's or the RFC master list (file: rfc-index.txt). Reference to a particular RFC is not intended to indicate that this is the only RFC involved with the specification but rather is to serve as a starting point for a reference. That is, for example, ARP has several RFCs depending upon its use (e.g. RFC 826 describes Address Resolution Protocol, RFC 925 describes proxy ARP, etc.).

Likewise, reference has been made to specific port numbers in some of the illustrative embodiments and discussion. RFC 1700, Assigned Numbers, has a list of well known port numbers. This may change over time and is not to be interpreted as limiting the applicability of the techniques disclosed.

Thus, a method and apparatus for firewall traversal are disclosed. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for traversing a firewall, comprising:
    initiating a first connection to go through said firewall;
    evaluating the first connection for a response from a remote system indicating a successful first connection;
    initiating a second connection to go through said firewall if a successful first connection is not established, wherein said second connection is different then said first connection;
    evaluating the second connection for a response from a remote system indicating a successful second connection;
    initiating a third connection to go through said firewall if a successful second connection is not established, wherein said third connection is different than said second connection and said first connection; and
    evaluating the third connection for a response from a remote system indicating a successful third connection.

2. The method of claim 1 wherein the first connection, the second connection, and the third connection is selected from the group consisting of Transmission Control Protocol (TOP) connection, User Datagram Protocol (UDP) connection, hypertext transfer protocol (HTTP) connection, hypertext transfer protocol (HTTP) connection via a proxy connection, and Internet Control Message Protocol (IOMP) connection.

3. The method according to claim 2, wherein initiating a TOP connection comprises initiating a TOP connection to a predefined address and port.

4. The method according to claim 2, wherein initiating a HTTP connection comprises initiating a HTTP connection to a predefined address using port 80.

5. The method according to claim 2, wherein Initiating a HTTP connection via a proxy connection further comprises determining a likely proxy address and port.

6. The method according to claim 5, wherein determining a likely proxy address and port further comprises packs sniffing.

7. The method according to claim 6, wherein packet sniffing further comprises:
sampling packets;
extracting information from the sampled packets; and
building a database of likely proxy addresses and ports.

8. The method according to claim 7, wherein extracting information from the sampled packets comprises extracting TCP port information.

9. The method according to claim 7, wherein extracting information from the sampled packs comprises examining TCP packets for HTTP data.

10. The method of claim 2 further comprising using Internet Protocol (IP).

11. The method according to claim 10, wherein initiating a HTTP connection via a proxy connection further comprises determining a likely proxy address by sampling packets and extracting IP addresses.

12. The method of claim 2 further comprising using Ethernet with the Transmission Control Protocol (TCP).

13. The method according to claim 12, wherein initiating a HTTP connection via a proxy connection further comprises determining a likely proxy address by sampling packets and extracting Ethernet addresses.

14. A machine-readable medium having stored thereon instructions, which when executed by a processor, causes saw processor to perform the following:
initiate a first connection to go through a firewall;
evaluate the first connection for a response from a remote system indicating a successful first connection;
initiate a second connection to go through said firewall if a successful first connection is not established, wherein said second connection is different than said first connection;
evaluate the second connection for a response from a remote system indicating a successful second connection;
initiate a third connection to go through said firewall if a successful second connection is not established, wherein said third connection is different than said second connection and said first connection; and
evaluate the third connection for a response from a remote system indicating a successful third connection.

15. The machine-readable medium according to claim 14, further configuring said processor to perform the following:
implement the first connection, the second connection, and the third connection selected from the group consisting of Transmission Control Protocol (TCP) connection. User Datagram Protocol (UDP) connection, hypertext transfer protocol (HTTP) connection, hypertext transfer protocol (HTTP) proxy connection, and Internet Control Message Protocol (ICMP) connection.

16. The machine-readable medium according to claim 15, further configuring said processor to perform the following:
examine network traffic; and
build a database of parameters likely to allow establishment of a HTTP connection via a proxy connection.

17. A method for traversing a firewall comprising:
means for initiating a first connection to go through said firewall;
means for evaluating the first connection for a response from a remote system indicating a successful first connection;
means for initiating a second connection to go through said firewall if a successful first connection is not established, wherein said second connection is different than said first connection;
means for evaluating the second connection for a response from a remote system indicating a successful second connection;
means for initiating a third connection to go through said firewall if a successful second connection is not established, wherein said third connection is different than said second connection and said first connection; and
means for evaluating the third connection for a response from a remote system indicating a successful third connection.

18. The apparatus of claim 17, wherein means for initiating the first connection, means for initiating the second connection, and mans for initiating the third connection further comprises means for initiating a connection selected from the group consisting of Transmission Control Protocol (TCP) connection, User Datagram Protocol (UDP) connection, hypertext transfer protocol (HTTP) connection, hypertext transfer protocol (HTTP) proxy connection, and Internet Control Message Protocol (IOMP) connection.

19. The apparatus of claim 18, wherein means for initiating a HTTP connection via a proxy connection further comprises determining a likely proxy address by sniffing packets and extracting information from the packets.

20. The apparatus of claim 18, wherein means for initiating a HTTP connection via a proxy connection further comprises determining a likely proxy address by receiving information from a computer connected to the firewall.

21. The apparatus of claim 17, further comprising means for updating firewall traversal strategies.

* * * * *

UNITED STATES PATENT AND TRADEMARK OFFICE
CERTIFICATE OF CORRECTION

| | | |
|---|---|---|
| PATENT NO. | : 7,631,349 B2 | Page 1 of 1 |
| APPLICATION NO. | : 09/759728 | |
| DATED | : December 8, 2009 | |
| INVENTOR(S) | : Schwartz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1481 days.

Signed and Sealed this

Eleventh Day of January, 2011

David J. Kappos
*Director of the United States Patent and Trademark Office*